United States Patent [19]

Snyder

[11] Patent Number: 4,614,466

[45] Date of Patent: Sep. 30, 1986

[54] DAMAGED RADAR RADOME REPAIR DEVICE

[75] Inventor: Howard E. Snyder, Seattle, Wash.

[73] Assignee: The United States of America as represented by the Secretary of the Air Force, Washington, D.C.

[21] Appl. No.: 616,454

[22] Filed: Jun. 1, 1984

[51] Int. Cl.[4] .............................................. B23C 3/02
[52] U.S. Cl. .................................................... 409/179
[58] Field of Search .............. 409/179, 178, 107, 109, 409/175; 29/56.5, 33.7, 564; 51/180

[56] References Cited

U.S. PATENT DOCUMENTS

| | | | |
|---|---|---|---|
| 2,917,819 | 12/1959 | Britton et al. | 29/401 |
| 2,962,717 | 11/1960 | Kofoid | 343/872 |
| 3,259,021 | 7/1966 | Appleton et al. | 409/178 X |
| 3,453,620 | 7/1969 | Fleming et al. | 343/18 |
| 3,687,007 | 8/1972 | Harris | 409/178 |
| 3,907,565 | 9/1975 | Burton et al. | 96/36.2 |
| 3,935,788 | 2/1976 | Gilmore | 90/12 R |
| 4,147,576 | 4/1979 | Beem et al. | 156/94 |
| 4,263,706 | 4/1981 | Smith | 29/564 |
| 4,271,638 | 6/1981 | Creech | 51/241 S |
| 4,293,862 | 10/1981 | Beavers | 343/872 |
| 4,297,061 | 10/1981 | Wolfe et al. | 409/179 |
| 4,305,344 | 12/1981 | Baskett | 118/305 |

FOREIGN PATENT DOCUMENTS

| | | | |
|---|---|---|---|
| 5023 | 10/1979 | European Pat. Off. | 409/179 |
| 2620761 | 12/1977 | Fed. Rep. of Germany | 409/178 |
| 551514 | 2/1943 | United Kingdom | 409/179 |
| 477791 | 8/1975 | U.S.S.R. | 409/179 |
| 546438 | 3/1977 | U.S.S.R. | 409/179 |

*Primary Examiner*—William R. Briggs
*Attorney, Agent, or Firm*—Donald J. Singer; Jacob N. Erlich; James E. Maslow

[57] ABSTRACT

Method and apparatus for repairing damaged tapered radar radomes. The method comprises the steps of preparing the damaged skin layers, affixing corresponding patches thereto and trimming same, where only the radome skin has been damaged, and, when both skin and core have been damaged, includes preparing the damaged skin layers and core, affixing an oversized repair core section in said prepared core, trimming the repair core section to an appropriate local configuration, affixing repair patches to the prepared skin layers and trimming same.

An apparatus in practice of the present invention comprises a support affixable to the surface of the radome, at least one circumferential track device coupled to the support, at least one meridional track device coupled to the circumferential track device, and a router carriage assembly coupled to the meridional track device. A particular router device capable of precision vertical adjustment to 0.0005" is also disclosed for practice with the above apparatus.

7 Claims, 6 Drawing Figures

DAMAGED RADAR RADOME REPAIR DEVICE

STATEMENT OF GOVERNMENT INTEREST

The invention described herein may be manufactured and used by or for the Government for governmental purposes without the payment of any royalty thereon.

BACKGROUND OF THE INVENTION

The present invention relates to repair of radomes, and more particularly, to repair of tapered radar radome structures.

It is known in sophisticated aircraft equipment to have communications devices operating in the very high and ultra high frequency range. Such communications devices often employ an antenna for sending and receiving signals, where it is customary to enclose such antenna in a protective structural body. Such structural body is desired to be transparent to radiation emitted by the antenna, and is commonly referred to as a radome. A radome serves to protect an antenna from the environment as well as providing a selected exterior geometry for the vehicle.

A radome must be designed for efficient energy transmission at the above frequencies and thus is ordinarily made relatively thin, in the order of one-half electrical wavelength in thickness, or possibly a small whole number multiple thereof, as well as being made thin to minimize weight. Furthermore, in the fabrication of radomes, it has been found preferable that a radome be constructed as a single piece employing several layers of structural material in a laminated honeycomb sandwich arrangement. These laminated structures often are assembled out of carefully selected materials so that a preselected gradient of electrical characteristics is obtained throughout the laminated sandwich. The gradient is selected so as to minimize the reflectance of radar from the surface of the radome. It is also known in the art that single piece construction is preferable to the joining together of a multiplicity of pieces of honeycomb because stress concentrations may occur and inherently weak portions of the structure may result.

Nevertheless, once a radome has been manufactured, it is typical that the electrical qualities of the radome, for the particular system to which it is adapted, have sought to have been maximized in addition to obtaining a structurally desirable contour. However, during operation a radome can be damaged by various kinds of flying debris. It is therefore essential to be able to repair an existing damaged radar radome to restore to its prior maximized electrical state and its desired physical contour.

Heretofore, in regard to tapered radar radomes, such damage repair has been considered inadequate in view of the inability to make precision repair. This repair is made difficult in view of the fact that a tapered radome is ordinarily comprised of an outer core ply having an outer fiberglass skin and a first honeycomb core, and an inner core ply having an inner fiberglass skin and a second honeycomb core, where the surfaces of the outer and inner core plies may variably be divergent and convergent with respect to each other. Also, damage repair may be sought to be limited to only one of these core plies, or to merely a skin surface alone, if no core damage has been sustained. This requires yet further precision in repair of a damaged tapered radome

SUMMARY OF THE INVENTION

It is therefore an object of the present invention to enable precision repair of damaged tapered radar radomes.

It is an additional object of the present invention to enable repair of a radar radome damage site where only a portion of the radome has been damaged.

The present invention relates to a method and apparatus for repairing damaged tapered radar radome skin layers and honeycomb core. The method comprises the steps of preparing the damaged skin layers for patching, affixing corresponding patches thereto and trimming the patches, where only the radome skin has been damaged. The method further comprises, when both skin and core have been damaged, the steps of preparing the damaged skin layers and damaged core for patching, affixing a repair core section in said prepared core, trimming said repaired core section to an appropriate local configuration, affixing repair patches to the prepared skin layers and trimming the patches.

An apparatus in practice of the present invention comprises a support affixable to the surface of the radome, at least one circumferential track device coupled to the support, at least one meridional track device coupled to the circumferential track device, and a router carriage assembly coupled to the meridional track device. A particular router device capable of precision vertical adjustment to 0.0005" is also disclosed for practice with the above apparatus.

DESCRIPTION OF THE DRAWINGS

The invention will be more clearly understood by reference to the following detailed description of a preferred embodiment thereof in conjunction with the accompanying drawings, in which.

DETAILED DESCRIPTION OF THE PREFERRED EMBODIMENT

Figure 1:
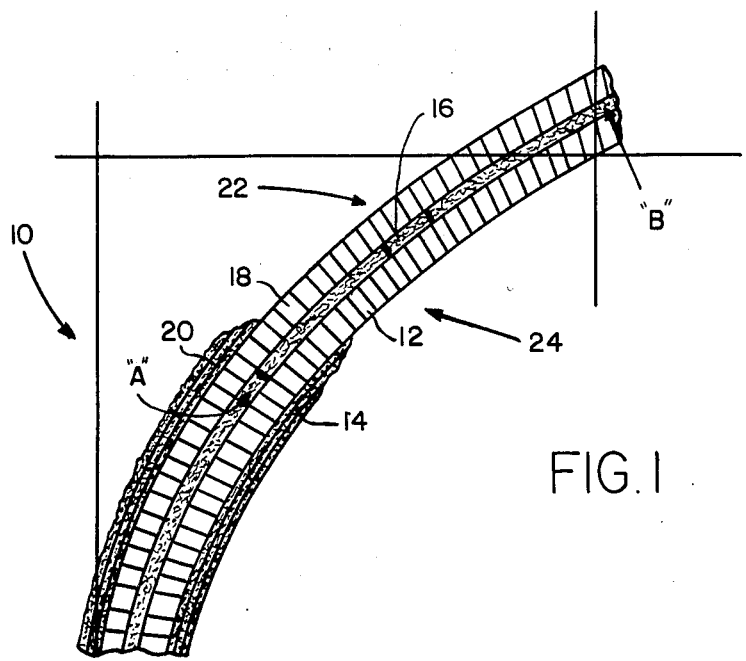
FIG. 1 is a schematic view of a portion of a multi-core radome.

Referring now to FIG. 1, the basic constituent elements are shown of a multi-core tapered radar radome 10. Radome 10 of FIG. 1 comprises a first core ply 22, a second core ply 24, and an intermediate fiberglass skin 16 thereinbetween. More particularly, core ply 22 comprises an inner honeycomb core 12 having affixed thereto at its inner surface an inner fiberglass skin 14. Affixed to the outer surface of inner core 12 is skin 16 and affixed to the upper surface of skin 16 is an outer honeycomb core 18. Affixed to the outer surface of outer honeycomb core 18 is an outer fiberglass skin 20. It will be further seen in FIG. 1 that cores 12 and 18 are divergent as indicated at arrow "A" and convergent as indicated at arrow "B". Furthermore, fiberglass skins 14 and 20 are each individually comprised of a plurality of bonded layers of fiberglass, as will be understood by those of ordinary skill in the art.

Figure 2:
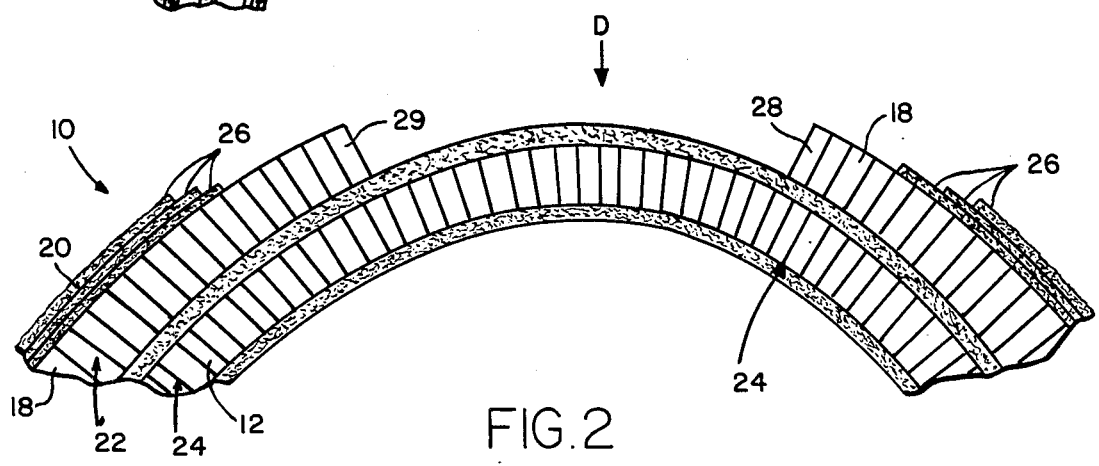
FIG. 2 is a schematic view of a prepared damaged portion of the radome of FIG. 1.

Referring now to FIG. 2, there is provided a schematic view of a prepared damaged portion of radome 10. The damaged radome 10 is shown comprised of the abovesaid outer core ply 22 and inner core ply 24, where outer skin 20 of core ply 22 is itself comprised of a multiplicity of layers of laminated fiberglass material 26. As seen in FIG. 2, radome 10 has been prepared for repair, where damage has been sustained to core ply 22 on the outer surface of radome 10 at area D. In the embodiment of FIG. 2, the damaged portion of outer honeycomb core 18 has been trimmed during preparation to straight end walls 28, 29. Thus, the trimmed damaged area D of core 18 is now ready for receipt of a repair core section. As well, the multiplicity of laminated layers 26 of outer skin 20 have been progressively trimmed and cut back in a fashion more particularly described later.

Figure 3:
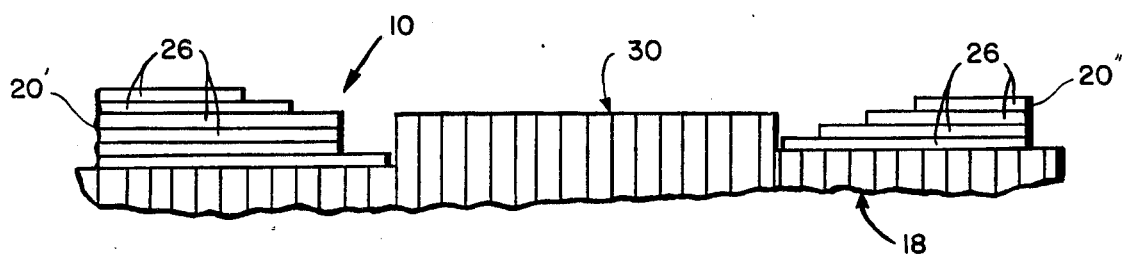
FIG. 3 is a flattened schematic view of the damaged portion of FIG. 2.

Referring now to FIG. 3, there is shown a flattened schematic view of the radome portion of FIG. 2 having a repair core section 30 inserted into the damaged core 18, where the portion of radome 10 shown in FIG. 2 has been drawn flattened out for illustrative purposes only. In FIG. 3, more particularly, an oversized repair core section 30 which has been prepared for matching with the abovesaid trimmed damaged area D of core 18, is shown inserted into core 18 at area D. It will be appreciated by those of ordinary skill in the art that radome 10 shown in FIG. 3 is tapered, where the more tapered portion of the radome appears in the right hand portion of FIG. 3. This will be understood in view of the fact that six-ply skin portion 20' is shown in the left hand part of the drawing and four-ply skin portion 20" is shown in the right hand part of the drawing. Thus it will be understood that this section of the radar radome tapers down from the left to the right as seen in FIG. 3. It will be further appreciated that a multiplicity of fiberglass layers 26 of skin 20 have been cut back in a graduated manner as shown. The method of such graduated cutting back requires the routing-out of a section of each of the abovesaid multiplicity of fiberglass layers 26, such that a series of ever-larger concentric arcs or circles is cut into the damaged skin 20. These concentric cuts are apparent (without enumeration herein) in the side view of FIG. 3 as they relate to the cut-back layers 26, wherein each concentric cut is routed to a depth equal to the thickness of the skin layer being routed-out, as will be appreciated by those skilled in the art.

It will now be appreciated that a series of appropriately contoured concentric circular stepped cuts have been made in the skin that surrounds the damaged area of radome 10 to be repaired. The depth of each of these stepped cuts is made to correspond with the specific fiberglass layer of the skin being routed and each cut will later be filled with a correspondingly matching disk of similar skin material. Nevertheless, after these stepped cuts are made in the skin, and after the damaged core is prepared as previously discussed, an oversized repair core section 30 is bonded into the cavity created by removal of the damaged core, as seen in FIG. 3. Repair core section 30 is then machined to a desired height and contour, as discussed below.

Figures 4, 5, 6:
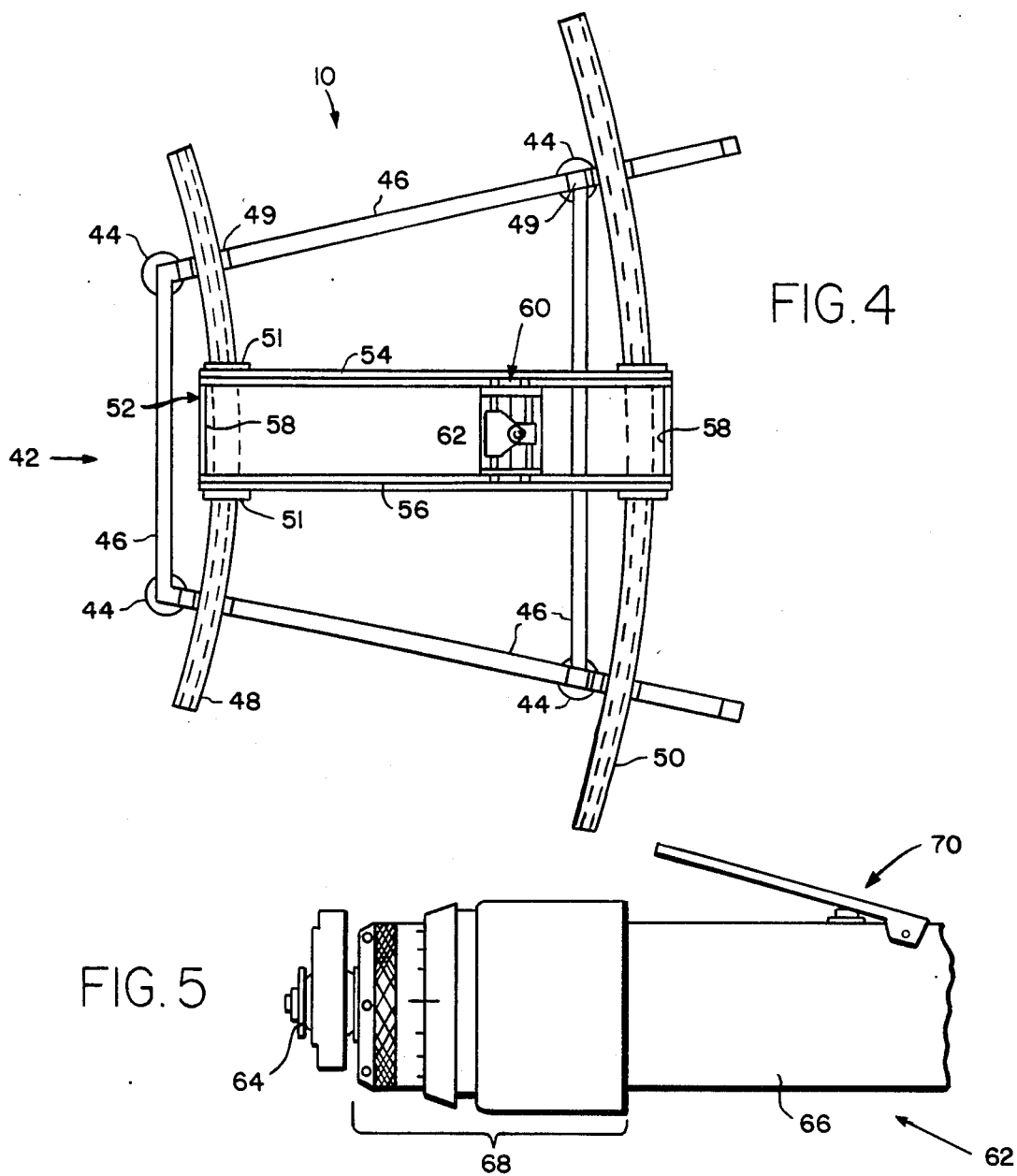
FIG. 4 is a top view of an embodiment of a tapered radome repair tool.
FIG. 5 is a side view of a routing tool for use in practice of the repair tool of FIG. 5.
FIG. 6 is a flattened cross-sectional view of the damaged radome portion of FIG. 2 repaired in practice of the present invention.

The abovesaid routing of circular cuts and the machining of the oversized repair core section 30 to a desired size and contour is accomplished in application of the apparatus shown in FIG. 4. FIG. 4 is a top view of a preferred embodiment of a tapered radar radome repair tool in practice of the present invention. In the embodiment of FIG. 4, repair tool 40 is attached to radome 10 by means of vacuum pads 44. Vacuum pads 44 are affixed to a support frame 46 also shown in FIG. 4, and are coupled to a vacuum source (not shown).

Also shown in FIG. 4 are circumferential tracks 48, 50 affixed to support frame 46. Circumferential tracks 48, 50 may be developed as arcuate-shaped corresponding to the local curved radome surface. Thus these tracks are contoured according to the local circumferential characteristics of the area of the radar radome over which the apparatus is to be affixed. This dimensional information may be obtained from the master drawing of the specific radome under repair. Thus, where this embodiment of the present invention is to be affixed for repair of a radar radome 10 contoured as seen in FIGS. 1 and 2, where frame 46 is mounted at that location, the circumferential tracks 48, 50 will be contoured according to the circumferential dimensions of that particular radome area and will be located in that area along support frame 46. Tracks 48, 50 may be locked in place along frame 46 by means of lock devices 49, as further discussed below.

Also shown in FIG. 4 is a meridional track assembly 52. Meridional track assembly 52 comprises a first and second track 54, 56 and joining members 58. Joining members 58 cooperate with meriodional tracks 54, 56 to maintain these tracks in fixed parallel relationship. Meridional track assembly 52 is slidably mounted on circumferential tracks 48, 50, and is provided with lock devices 51, as further discussed below.

The contour of meriodional tracks 54, 56 is derived from the master drawings of the particular radome surface under repair. This information may be translated to numerical values for directing numerically controlled machining of the tracks.

As also seen in FIG. 4, a router carriage assembly 60 is slidably affixed to meriodional tracks 54, 56. Affixed to this router carriage 60 is an adjustable core routing tool 62, as more fully described below.

Referring now to FIG. 5, there is shown a side view of a preferred embodiment of a core routing tool 62 in practice of the present invention. The core routing tool 62 of FIG. 5 comprises a routing head 64 which is adjustably mounted to a housing 66, where housing 66 contains a drive means (not shown). This adjustable mounting is accomplished by a micrometer adjustment device 68, as shown in FIG. 5, and which is preferably controllable to increments of 0.0005 inch. The core routing tool 62 also comprises a control switch assembly 70, as shown.

Turning now to FIG. 6, there is shown a flattened cross-sectional view of the damaged core ply 22 of radome 10 which has been repaired in practice of the present invention. Thus skin 20 is shown comprised of six-ply skin portion 20' and four-ply skin portion 20", contouredly mated above the now machined repair core section 30. Six-ply skin portion 20' and four-ply portion 20" are mated by means of replacement skin pieces 31 a-f, each of which is individually contoured to fit into a respective one of the routed-out concentric cuts deformed into the surface of radome 10, as earlier described.

In practice of the present invention, support frame 46 is firmly affixed to the radome over the surface to be repaired by means of vacuum pads 44. Thereafter, appropriately dimensioned circumferential tracks 48, 50 are individually adjusted to a best fit arrangement with the local circumferential contour of the area of the radome under repair, whereupon each circumferential track 48, 50 may be locked in place along the support frame 46 by means of lock devices 49. Next, appropriately dimensioned meridional track assembly 52 is adjusted to a best fit arrangement over the exposed surface under repair and may be locked in place by means of lock devices 51. It will be appreciated by those of ordinary skill in the art that selective locking of lock devices 49 and 51 will be determined by the individual routing profile desired at the damage site location under repair.

Referring again to FIG. 6, it will now be understood that by means of operation of the present invention, a repair core section 30 of honeycomb material is precisely contoured and becomes a part of core 18 so as to optimize the electrical and structural characteristics of the radome core thereat. It will be further understood that the upper surface of finished repair core section 30 is contiguous with the upper surface of the existing core 18. It will also be appreciated that in practice of the present invention the outer skin of the radome can be precisely replicated at a patch area, again as indicated in FIG. 6. Thus at the intersection of the six-ply skin portion 20' and four-ply skin portion 20" a desired surface contour may be achieved. As will be further seen in FIG. 6, the various layers 26 of skin 20 have been routed out in practice of the present invention such that replacement sections of fiberglass material configured as the particular case requires are placed in the routed-out pattern. Thus, along with precise repair of a damaged core, the precise layering effect as shown and described hereinabove in practice of the present invention will closely approximate the characteristics of the skin area replaced. In this manner, superior electrical and structural characteristics of the repaired core and skin can be achieved.

While the present invention has been described in connection with rather specific embodiments thereof, it will be understood that many modifications and variations will be readily apparent to those of ordinary skill in the art and that this application is intended to cover any adaptation or variation thereof. Therefore, it is manifestly intended that this invention be limited only by the claims and equivalents thereof.

I claim:

1. An apparatus for repair of a damaged radome, comprising:
   a support capable of being affixed to the exterior of said damage radome;
   a pair of spaced apart tracks slidably coupled to said support, said tracks being contoured to the local circumference of said damaged radome;
   a meridional track device slidably coupled to said pair of spaced apart tracks, said meridional track device having a first and a second track and means for maintaining said first and second tracks in fixed, parallel, spaced apart relationship to one another; and
   a router carriage assembly slidably mounted upon said first and second tracks of said meridional track device.

2. The apparatus of claim 1, wherein said support comprises vacuum pads and a support frame.

3. The apparatus of claim 2, further comprising means to lock said pair of spaced apart tracks in a fixed position on said support frame and means to lock said meridional track device in a fixed position on said pair of spaced apart tracks.

4. The apparatus of claim 3, wherein said pair of spaced apart tracks are of an arcuate shape.

5. The apparatus of claim 4, wherein said router carriage assembly further comprises a router tool.

6. The apparatus of claim 5, wherein said router tool comprises:
   a router head;
   a housing; and
   means for adjusting the height of said router head relative to said housing.

7. The apparatus of claim 6, wherein said means for adjusting is adjustable in increments of 0.0005".

* * * * *